Patented May 25, 1937

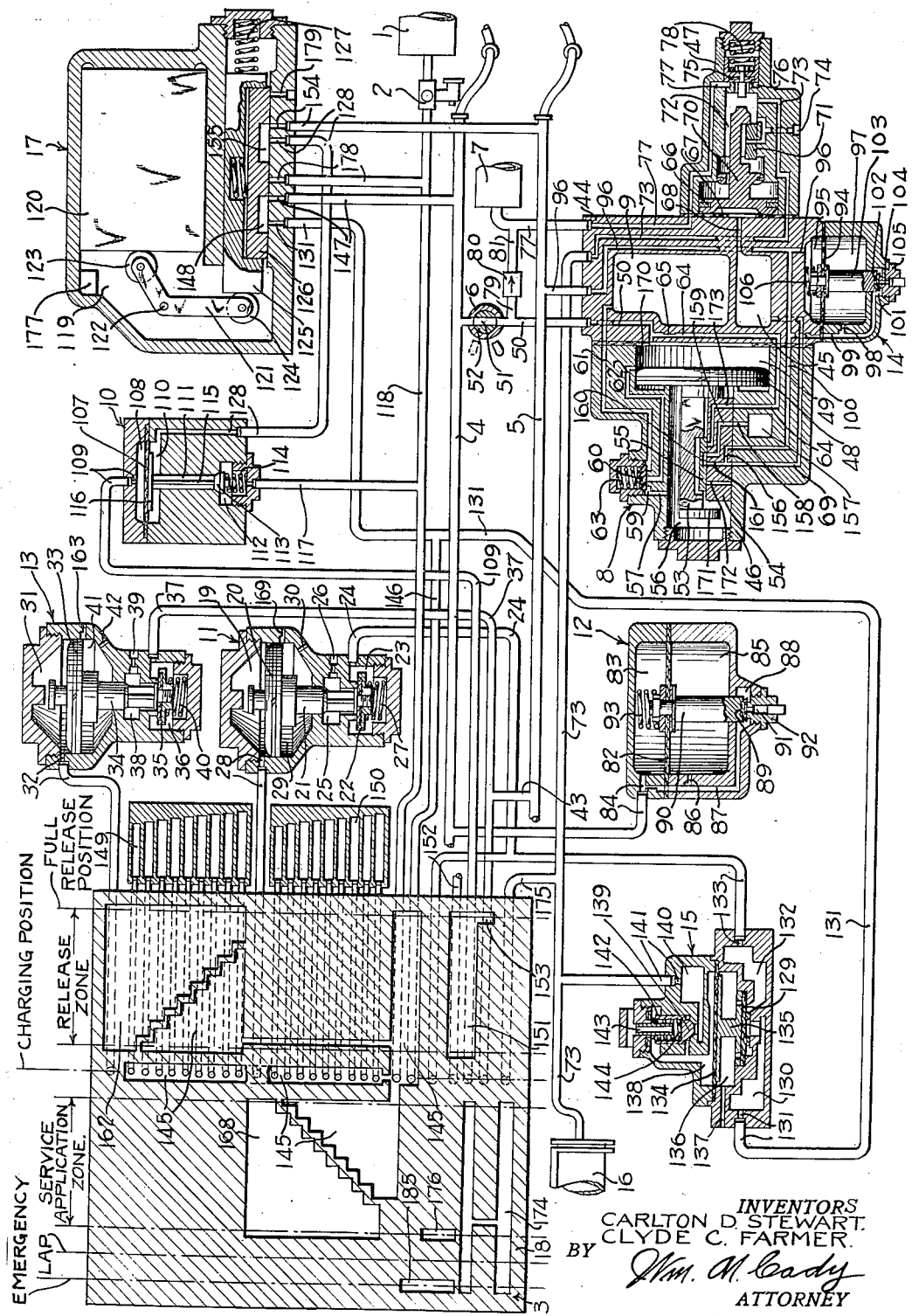

2,081,463

UNITED STATES PATENT OFFICE 2,081,463

BRAKE EQUIPMENT FOR RAILWAY VEHICLES

Carlton D. Stewart, Berkeley, Calif., and Clyde C. Farmer, Pittsburgh, Pa., assignors to The Westinghouse Air Brake Company, Wilmerding, Pa., a corporation of Pennsylvania Application December 12, 1934, Serial No. 757,138

59 Claims. (Cl. 303—26)

This invention relates to brake equipments and more particularly to brake equipments for high speed railway trains and traction vehicles.

The trend of modern transportation methods, with particular reference to passenger transportation, is toward faster schedules and higher speeds, which calls for a quick acting and reliable brake equipment, by means of which high speed trains or vehicles may be controlled safely and expeditiously.

The principal object of the present invention is to provide a fluid pressure brake equipment for use on trains or vehicles to be operated at high speeds and which will meet the above mentioned transportation requirements.

Another object of the invention is to provide a fluid pressure brake equipment having means including an improved brake valve device operative to effect either an application or a release of the brakes in substantially uniform steps or increments, or operative to effect either a straight away application of the brakes or a straight away release of the brakes.

It is well known that in brake equipments employing friction brakes, such, for instance, as clasp brakes which engage with the treads of the vehicle wheels, the coefficient of friction between brake shoes and the wheels is greater at the lower speeds than at the higher speeds. As a consequence, when the train or vehicle is moving at high speed and the brakes are applied with sufficient force as to cause the wheels to slide when the speed has been reduced to some slow speed, such as twenty miles per hour, the braking force must be reduced before the wheels are caused to slide. Wheel sliding is undesirable in that it causes flat places to be worn on the wheel treads and at the same time greatly reduces the retarding effect of the brakes and renders it difficult to bring the train or vehicle to a stop with any degree of accuracy.

A further object of the invention is to provide means automatically operative, according to the rate of retardation of the train or vehicle, to so control the brakes that the braking force thereof will be kept below that which will produce sliding of the wheels.

A still further object of the invention is to provide means for conserving fluid under pressure when a full service application of the brakes has been effected. This object is attained by means of a cut-off valve device which is operative when the maximum brake cylinder pressure obtainable in effecting a service application of the brakes, is approached for cutting off the flow of fluid from the brake pipe by way of the brake valve device and other brake pipe venting means with which the equipment may be provided.

Other objects and advantages will appear in the following more detailed description of the invention.

In the accompanying drawing, the single figure is a diagrammatic view, mainly in section, of a fluid pressure brake equipment embodying the invention.

The equipment illustrated in the drawing is for the head end or control car of a train, and as will hereinafter be described, certain of the devices will be employed on other cars of the train and the other devices will be omitted. For the purpose of simplifying the following detailed description, the equipment will, for the most part, be treated as applying to one car. However, the devices which constitute the equipment for each of the other cars of the train will be specifically named.

As shown in the drawing, the brake equipment may comprise a main reservoir 1, a feed valve device 2, a brake valve device 3, a brake pipe 4, a release pipe 5, a cut-out cock 6, a supply reservoir 7, a brake controlling valve mechanism 8, an auxiliary reservoir 9, a release pipe charging valve device 10, an application pilot vent valve device 11, an application transmitter vent valve device 12, a release pilot vent valve device 13, a release transmitter vent valve device 14, a brake pipe reduction cut-off valve device 15, a brake cylinder 16, and a retardation controller valve device 17.

The brake valve device 3 may be of the usual type, having a rotary valve 18 which is adapted to be moved to its several controlling positions through the medium of the usual operating handle (not shown).

The application pilot vent valve device 11 comprises a casing having a piston chamber 19 containing a piston 20 which is provided with a stem 21 adapted to control the operation of a vent valve 22 contained in a chamber 23 to which is connected a pipe 24, which constitutes a branch of a pipe 133 leading from the brake pipe cut-off valve device 15 to the seat for the brake valve 18. The valve 22 is operative to control communication from the chamber 23 to a chamber 25 which is constantly connected by way of a restricted passage 26 with the atmosphere, said valve being normally maintained closed by the action of a spring 27 contained in chamber 23. The piston chamber 19 is connected to a passage and pipe 28 leading to the seat of the rotary valve 18 of the brake valve device. At the stem side of the piston is a chamber 29 which is in constantly open communication through a passage 30 with the atmosphere.

The release pilot vent valve device 13 may be identical in construction with the vent valve device 11 and may comprise a casing having a piston chamber 31, which is connected through a passage and pipe 32 to the seat of the rotary valve 18 of the brake valve device 3 and which contains a piston 33 having a stem 34 adapted to control the operation of a vent valve 35 contained in a chamber 36, which is connected to a pipe 37 leading to the seat for the rotary valve 18. The valve 35 is operative to control communication from the valve chamber 36 to a chamber 38 which is constantly connected, through a restricted passage 39, with the atmosphere, said valve being normally maintained closed by the action of a spring 40 contained in valve chamber 36. At the stem side of the piston is a chamber 41 which is in constantly open communication through a passage 42 with the atmosphere. The pipe 37 above mentioned is connected through a branch pipe 43 to the release pipe 5.

The brake controlling valve mechanism 8 may comprise a pipe bracket 44 having formed therein the auxiliary reservoir 9 and a volume reservoir 45 and also comprises an equalizing valve device 46 having a casing secured to one side of the pipe bracket, and an application and release valve device 47 having a casing secured to another side of the bracket. The pipe bracket also carries the release transmitter valve device 14.

The equalizing valve device 46 may comprise a piston 48 which is contained in a piston chamber 49 connected through a passage and pipe 50 and a passage 51 in the plug valve 52 of the cut-out valve device 6 to the brake pipe 4, and which is provided with a stem 53 adapted to operate a main slide valve 54 and an auxiliary slide valve 55 contained in a valve chamber 56 connected to the auxiliary reservoir 9 by way of a passage 57, a check valve chamber 59 containing a check valve 60, and a passage 61. With the equalizing piston 48 in its innermost or release position as shown, the piston chamber is connected to a passage 62 leading to the seated side of the check valve 60, said check valve being subject to the pressure of a spring 63 which at all times tends to urge the valve toward its seat.

Leading from the brake pipe passage 50 to the seat for the equalizing main slide valve 54, is a quick service passage 64 which is provided with a restriction 65.

The application and release valve device 47 may comprise a piston 66 which is contained in a piston chamber 67 connected by way of a passage 68 with the volume reservoir 45 connected to a passage 69 leading to the seat for the equalizing main slide valve 54. The piston 66 is provided with a stem 70 adapted to actuate a slide valve 71 contained in a valve chamber 72 which is constantly connected through a passage and pipe 73 with the brake cylinder 16. With the slide valve 71 in release position, as shown in the drawing, the valve chamber 72 is connected through a passage 74 with the atmosphere. The piston stem 70 is also adapted to control the operation of a supply valve 75 contained in a chamber 76 which is connected through a passage and pipe 77 with the supply reservoir 7. This valve 75 is adapted to control communication between the valve chamber 72 and chamber 76 and with the piston stem in release position as shown in the drawing, the valve is maintained closed by the action of a spring 78.

Between the cut-out cock 6 and the brake controlling valve mechanism 8, the pipe 50 is connected with the supply reservoir 7 by way of a branch pipe 79, a check valve device 80, a pipe 81 and pipe 77.

The application transmitter valve device 12 may comprise a casing in which there is secured a flexible diaphragm 82. At one side of the diaphragm is a chamber 83 to which the brake pipe 4 is connected through a pipe and passage 84, and at the other side of the diaphragm is a chamber 85 which is connected through a restricted passage 86 to a restricted passage 87 leading from the passage 84 to a chamber 88 containing a vent valve 89 which is operative, through the medium of a stem 90 secured to the flexible diaphragm, to control communication from the chamber 88 to an atmospheric passage 91 in a plug 92 having screw-threaded connection with the casing. The passage 86 is located at a point intermediate the choked portion of the passage 84 and the valve chamber 88. Contained in the chamber 83 is a spring 93 which acts through the medium of the flexible diaphragm and stem 90 to normally urge the valve 89 to its seated position as shown in the drawing.

The release transmitter valve device 14 is of substantially the same construction as the valve device 12 and may comprise a casing section which is secured to the pipe bracket 44 of the brake controlling valve mechanism 8, and may also comprise a flexible diaphragm 94 which is clamped between the pipe bracket and casing section. At one side of the diaphragm is a chamber 95 which is in constant open communication, through a passage and pipe 96, with the release pipe 5, and at the other side of the diaphragm is a chamber 97 which is connected through a restricted passage 98 to a restricted passage 99 leading from a branch 100 of the passage 96 to a chamber 101 containing a vent valve 102 which is operative, through the medium of a stem 103 secured to the flexible diaphragm, to control communication from the chamber 101 to an atmospheric passage 104 in a plug 105 having screw-threaded connection with the casing. The passage 98 is connected to the passage 99 at a point intermediate the restricted portion of the passage 99 and the valve chamber 101. Contained in the chamber 95 is a spring 106 which acts through the medium of the diaphragm and stem 103 to normally urge the valve 102 to its seated position as shown in the drawing. The branch passage 100 just referred to leads to the seat for the equalizing main slide valve 54.

The release pipe charging valve device 10 may comprise a casing having a flexible diaphragm 107 mounted therein. At one side of the diaphragm there is a chamber 108 which is connected through a passage and pipe 109 to the seat for the rotary valve 18 of the brake valve device, and at its other side is a chamber 110 which is adapted to communicate through a passage 111 with a valve chamber 112 containing a charging valve 113, which valve, due to the action of a spring 114, is normally maintained in position closing said communication. The valve 113 is provided with a fluted stem 115 which, at its end, is adapted to be operatively engaged by a follower plate 116 carried by the flexible diaphragm, said diaphragm being operative to control the operation of the stem and thereby the valve. The charging valve chamber is in constant open communication through a pipe 117 with a feed valve or charging pipe 118.

The retardation controller device 17 is for the purpose of controlling the brakes so as to limit the rate of retardation produced by an application of the brakes and may comprise a casing having a chamber 119 containing an inertia operated member 120, which in the present embodiment of the invention, is slidably guided by the casing. Also contained in the chamber 119 is a lever 121 which is pivotally secured, between its ends, to the casing by means of a pin 122. One end of the lever has a roller 123 rotatably secured thereto which operatively engages the forward end of the member 120 and the other end of the lever has a roller 124 rotatably secured thereto which operatively engages the left hand end of a plunger 125 slidably mounted in the casing, said plunger being provided for the purpose of operating a slide valve 126. Interposed between and engaging the right hand end of the plunger and the casing is a spring 127 which is of such a value as to normally maintain the plunger and thereby the slide valve and member 120 in the position in which they are shown in the drawing.

The diaphragm chamber 119 of the release pipe charging valve device 10 is connected with a passage and pipe 128 leading to the seat for the slide valve 126 of the retardation controller device.

The cut-off valve device 15 is provided for the purpose of cutting off the flow of fluid from the brake pipe to the atmosphere, when, in effecting a service application of the brakes, the brake cylinder pressure has been increased to a predetermined degree, thereby limiting the maximum brake cylinder pressure obtainable in effecting a service application of the brakes. This device may comprise a casing having a cut-off diaphragm valve 129 secured thereto and operative to control a communication between a chamber 130 connected to a passage and pipe 131 leading to the seat for the retardation controller slide valve 126, and a chamber 132 connected to a passage and pipe 133 leading to the seat for the rotary valve 18 of the brake valve device. Also secured to the casing in spaced relation to the diaphragm valve 129 is a flexible diaphragm 134, which is of greater diameter than the diaphragm valve and which is operatively connected with the diaphragm valve by means of a follower member 135. The flexible diaphragm 134, diaphragm valve 129 and casing define a chamber 136 which is constantly connected by way of a passage 137 with the atmosphere.

At the face side of the flexible diaphragm 134 is a valve chamber 138 containing a control piston valve having a valve 139 which is adapted to control communication between this chamber and a chamber 140 which is connected through a passage and pipe 141 to the brake cylinder pipe 73 and also having a valve 142 which is adapted to control communication between the chamber 138 and a passage 143 leading to the atmosphere. Interposed between and engaging the piston valve is a spring 144 which normally maintains the piston valve in position to seat the valve 139. With the valve 139 seated, the valve 142 will be open, so that the valve chamber 138 is normally open to the atmosphere.

The equipment hereinbefore described is for the head or control car of the train. The equipment for each of the other cars may comprise the brake pipe 4, release pipe 5, cut-out cock 6, supply reservoir 7, brake controlling valve mechanism 8, a brake cylinder 16, check valve device 80, application transmitter valve device 12, release transmitter valve device 14, all of which are identical in construction with the corresponding parts on the head car and which are embodied in the system in the same manner as shown in the drawing.

It will be understood that the brake pipe and release pipe, in effect are continuous from end to end of the car, there being the usual angle cocks (not shown) or the like at each end of the train, which are normally closed.

*Initial charging*

In initially charging the equipment, the brake valve 18 is moved to charging position as shown in the drawing, in which position, fluid under pressure, supplied to the pipe 119 by the feed valve device 2, flows to the brake pipe 4 by way of a cavity 145 in the brake valve 18 and a pipe 146, pipe and passage 131, cavity 148 in the retardation controller slide valve 126, and passage and pipe 147. From the brake pipe 4, fluid under pressure flows to the equalizing piston chamber 49 of the brake controlling valve device 8 by way of the passage 51 in the cut-out plug valve 52 and pipe and passage 50, and from the chamber 49 flows through passage 62 and past the check valve 60 to both the auxiliary reservoir 9 and equalizing slide valve chamber 56, the flow to the auxiliary reservoir being by way of passage 61 and to the valve chamber by way of passage 57. From the pipe 50, fluid under pressure flows through pipe 79, check valve device 80, pipe 81 and pipe 77 to both the supply reservoir 7 and supply valve chamber 76 of the brake controlling valve device 8.

With the release slide valve 71 of the application and release device of the brake controlling valve mechanism 8 in release position as shown in the drawing, the brake cylinder 16 is connected to the atmosphere by way of pipe and passage 73, slide valve chamber 72 and passage 74. Since the chamber 140 of the cut-off valve device 15 is connected through passage and pipe 141 to the pipe 73, said chamber will also be connected to the atmosphere, so that the valve 139 will be held seated by the action of the spring 144 and the valve 142 will be held unseated. With the valve 142 seated, the chamber 138 is connected through passage 143 with the atmosphere.

From the brake pipe 4, fluid flows to the chamber 130 of the cut-off valve device 15, through a pipe and passage 147, a cavity 148 in the retardation controller slide valve 126, and passage and pipe 131. Since the chamber 138 is at atmospheric pressure, fluid under pressure in chamber 130 causes the diaphragm valve 129 to be flexed away from its seat, so that fluid under pressure flows from the chamber 130 to the chamber 132 and pipe 133 leading to the seat of the rotary valve 18 of the brake valve device 3, said rotary valve in every position, except full service position and emergency position, lapping the communication from the pipe 133. From the pipe 133, fluid under pressure flows through pipe 24 to the valve chamber 23 of the application relay vent valve device 11.

Fluid under pressure flows from the brake pipe 4 through pipe and passage 84 to the diaphragm chamber 83 of the application transmitter valve device 12 and to the diaphragm chamber 85 by way of passages 84, 87 and 86.

Associated with the brake valve device 3 are a plurality of release reservoirs 149 and a plurality of application reservoirs 150, all of which are in communication with the cavity 145 when the brake valve 18 is in charging position, so that they are charged with fluid at feed valve pressure. These reservoirs, as will hereinafter be more fully described, are each of small volume to insure the application or release of the brakes in small increments or steps and the volumes of the reservoirs of each set vary from each other to insure the application or release of the brakes, as the case may be, in uniform increments or steps.

With the equipment thus fully charged, the brake valve 18 is moved to full release position, which may also be running position. In this position, the pipes 118 and 146 are maintained connected together by the cavity 145. The communications from the application reservoirs 150 are lapped by the brake valve, so that fluid at feed valve pressure is bottled up in these reservoirs. Further, a cavity 151 in the brake valve 18 connects the communications 109 and 37 to an atmospheric communication 152, the cavity having a toe portion 153 with which the communication 37 registers. With these connections established, the diaphragm chamber 108 of the release pipe charging valve device 10, valve chamber 36 of the release pilot vent valve 13 and release pipe 5 are connected to the atmosphere. The release pipe is in communication with the diaphragm chamber 110 of the charging valve device 10 by way of a pipe and passage 154, a cavity 155 in the retardation controller slide valve 126 and passage and pipe 128, so that said chamber is connected with the atmosphere.

The piston chamber 67 of the application and release valve device of the brake controlling valve device 8 is connected to the release pipe 5 by way of passage 68, volume reservoir 45, passage 69, a cavity 156 in the equalizing main slide valve 54, passage 100 and passage and pipe 96, so that this chamber 67 is connected to the atmosphere.

With the passages 100 and 96 connected to the atmosphere, the diaphragm chambers 95 and 97 of the release transmitter valve device 4 are connected to the atmosphere.

The equalizing valve device is provided with a quick service reservoir 157 which is connected to the atmosphere by way of a passage 158, a port 159 in the equalizing main slide valve 54, a cavity 160 in the auxiliary slide valve 55 and a port 161 in the main slide valve leading to the cavity 156.

Further, with the brake valve 18 in full release position, the release reservoirs 149 are vented to the atmosphere by way of a cavity 162 in the brake valve 18, pipe and passage 32, piston chamber 31 of the release pilot valve device 13 and a restricted passage 163, the fluid under pressure in said chamber 31 moving the piston 33 inwardly, so as to uncover the passage 163 and maintaining it in this position until the pressure in chamber 31 is reduced to substantially atmospheric pressure, when the spring 40 acts to return the piston to its normal position as shown in the drawing.

*Service application of the brakes*

When it is desired to effect a service application of the brakes, the operator, by the use of the usual brake valve handle, moves the brake valve 18 to any desired position in the service application zone, the position chosen being dependent upon the degree of application desired.

If a light application of the brakes is desired, the brake valve is moved to the first position in the service application zone, in which a cavity 168 in the valve connects the first application reservoir 150 to the pipe 28, so that fluid under pressure flows from the reservoir to the piston chamber 19 of the application pilot vent valve device 11, causing the piston to quickly move to its inner position, unseating the vent valve 22 and uncovering a restricted atmospheric passage 169 to the piston chamber.

With the vent valve 22 unseated, fluid under pressure is vented from the brake pipe 4, and thereby from the diaphragm chamber 83 of the vent valve device 12, to the atmosphere by way of pipe and passage 147, cavity 148 in the retardation controller slide valve 126, passage and pipe 131, chamber 130 of the cut-off valve device 15, past the unseated diaphragm valve 129, chamber 132, pipes 133 and 24, vent valve chamber 23 of the pilot valve device, past the unseated vent valve 22, chamber 25 and restricted passage 26. The flow of fluid from the diaphragm chamber 83 will be at a faster rate than that at which fluid can flow from the diaphragm chamber to the passage and pipe 84 by way of the restricted passages 86 and 87 and as a result of this, fluid at the higher pressure in chamber 85 causes the diaphragm to be deflected a sufficient distance to unseat the vent valve 89. With the vent valve unseated, fluid under pressure flows from the brake pipe to the atmosphere by way of pipe and passage 84, restricted passage 87 and passage 91 in the plug 92.

With the chamber 19 open to the passage 169, fluid supplied to the chamber is permitted to flow to the atmosphere and when, by reason of such flow, the pressure of the chamber has been reduced to substantially that of the atmosphere, the spring 40 acts to seat the vent valve 22 and thereby cut off the flow of fluid from the brake pipe by way of the valve device 11. The valve 22, as it is being moved toward its seated position, shifts the piston 20 to its outer or normal position, in which the communication between the piston chamber 19 and the atmospheric passage 169 is closed.

As fluid under pressure is being vented from the brake pipe by way of the unseated vent valve 89 of the vent valve device 12, fluid under pressure flows from the diaphragm chamber 85 to the atmosphere by way of the restricted passage 86 and passage 87. Now, when the pressure of fluid in chamber 85 has been reduced by such flow, to substantially the pressure of fluid in chamber 83 which is also reducing, the spring 93 acts through the medium of the diaphragm 82 and stem 90, to seat the vent valve 89, thereby cutting off the flow of fluid from the brake pipe to the atmosphere.

It will here be noted the valve device 11 operates to effect a predetermined reduction in brake pipe pressure on the head or control car of the train and that the application transmitter vent valve device 12 on the cars of the train will quickly respond to such reduction to locally vent fluid under pressure from the brake pipe on each car, thus rapidly propagating the reduction in brake pipe pressure serially throughout the length of the train.

The reduction in brake pipe pressure is, of course, effective in the equalizing piston chamber 49 of the brake controlling valve mechanism 8, and due to this, fluid at a higher pressure in the equalizing valve chamber 56, causes the piston 48 to move to application position, in which it engages a gasket 170 clamped between the pipe bracket 44 and the casing of the equalizing valve device. The piston, as it initially moves toward application position, acting through the medium of the stem 53, causes the auxiliary slide valve 55 to be shifted relative to the main slide valve 54 until a lug 171 on the piston stem engages the rear end of the main slide valve and then causes both valves to be shifted in unison to application position. When the lug 171 engages the main slide valve, the auxiliary slide valve will have uncovered a service port 172 in the main slide valve and will have moved the cavity 160 into connecting relation with the quick service port 159 in the main slide valve and a quick service port 173 also in the main slide valve, said port 173 being in registration with the quick service passage 64.

With the ports 159 and 173 connected, fluid under pressure is vented from the brake pipe and equalizing piston chamber 49 to the quick service chamber 157 by way of passage 64, port 173 in the main slide valve 54, cavity 160 in the auxiliary slide valve 55, port 159 in the main slide valve and passage 158, the resulting reduction in the pressure of fluid in the piston chamber 49 serves to accelerate the movement of the equalizing piston 48 and thereby both the main and auxiliary slide valves to application position.

The main slide valve, as it is being moved toward application position, first cuts off the quick service flow of fluid and just as it reaches application position brings the service port in registration with the passage 69, so that fluid under pressure now flows from the equalizing valve chamber 56 and connected auxiliary reservoir 9 to the piston chamber 67 of the application and release valve device 47 by way of the service port 172 in the main slide valve 54, passage 69, volume reservoir 45 and passage 68. Fluid under pressure supplied to the piston chamber 67 causes the piston 66 and stem 70 to move inwardly, first shifting the slide valve 71 to lap the passage 74 leading from the valve chamber 72 to the atmosphere. After the passage 74 is thus lapped, the continued movement of the piston causes the stem 70 to engage and unseat the supply valve 75 against the opposing pressure of the spring 78. Fluid under pressure now flows from the supply reservoir 7 to the brake cylinder 16 by way of pipe and passage 77, supply valve chamber 76, past the unseated supply valve 75, release slide valve chamber 72 and passage and pipe 73. From the pipe 73, fluid under pressure flows through pipe and passage 141 to the chamber 140 of the cut-off valve device 15.

Further, with the brake valve 18 in any position in the service application zone, a cavity 174 in the valve connects pipe 109 to a pipe 175 connected to the brake cylinder pipe 73, so that fluid under pressure flows from the pipe 73 to the diaphragm chamber 108 in the release pipe charging valve device 10. Fluid thus supplied to chamber 108 causes the diaphragm 107 to flex inwardly, said diaphragm acting through the medium of the follower plate 116 and fluted valve stem 115 to unseat the valve 113 against the opposing pressure of the spring 114. With the valve 113 unseated, fluid under pressure flows from the pipe 118 to the release pipe 5 by way of pipe 117, valve chamber 112, past the valve 113, passage 111, diaphragm chamber 110, passage and pipe 123, cavity 155 of the retardation controller slide valve 126 and passage and pipe 154.

From the release pipe, fluid under pressure flows through pipe and passage 96 to the diaphragm chamber 95 of the release transmitter vent valve device 14 and from the passage 96 flows through passage 100, restricted passages 99 and 98 to the diaphragm chamber 97.

When, after the venting of fluid from the brake pipe has been closed off, the pressure of fluid in the slide valve chamber and auxiliary reservoir 9 of the equalizing valve device 46 has been reduced, by reason of the flow of fluid therefrom to the volume chamber 45 and piston chamber 67, to slightly below the reduced brake pipe pressure in the equalizing piston chamber 49, the equalizing piston 48 and thereby the auxiliary slide valve 55 will be moved rearwardly from application position relative to the main slide valve 54. The auxiliary slide valve, as it is thus being moved, laps the service port 172 of the main slide valve, thus cutting off the flow of fluid from the valve chamber 56 and auxiliary reservoir to the volume chamber 45 and piston chamber 67. As no further reduction in the pressure of fluid in the valve chamber 56 now occurs, the equalizing piston and auxiliary slide valve come to a stop before the piston can shift the main slide valve from its application position.

Now, when the pressure of fluid in the valve chamber 72 of the application and release valve device 47 becomes substantially equal to the pressure of fluid in the piston chamber 67, the spring 78 acts to move the supply valve 75, piston stem 70, slide valve 71 and piston 66 forwardly in unison until the valve seats and cuts off the flow of fluid to the valve chamber. Since, with the supply valve closed, there is now no increase in the chamber pressure, the piston and slide valve come to a stop before the slide valve can uncover the passage 74 leading to the atmosphere.

When the pressure of fluid in the diaphragm chamber 110 of the charging valve device 10 increases to substantially the pressure of fluid in the diaphragm chamber 108, the spring 114 acts to seat the valve 113 so as to cut off the flow of fluid from the pipe 118 to the release pipe 5.

If, after the brake valve 18 has been moved to the first application position in the service application zone, it is desired to increase the brake cylinder pressure a small amount, the brake valve 18 is moved to the second application position in the service application zone, in which fluid under pressure in the second application reservoir 150 is supplied to the piston chamber 19 of the application pilot vent valve device 11, causing said device and the application transmitter vent valve devices 12 throughout the train to vent fluid under pressure from the brake pipe 4. The reduction in brake pipe pressure resulting from such venting causing the equalizing piston 48 to be moved from application lap position to application position, in which fluid under pressure is supplied from the auxiliary reservoir to the volume reservoir 45 and piston chamber 67, causing the piston 66 and thereby the stem 70 to move and unseat the supply valve 75 to permit additional fluid to flow from the supply reservoir 7 to the brake cylinder 16 and to the diaphragm chamber 108 of the charging valve device 10, thus increasing the pressure of fluid in the brake cylinder and chamber. The increase in the pressure of fluid in chamber 108 causes the charging valve device 10 to function to admit additional fluid under pressure from the pipe 118 to the release pipe 5. It will here be understood that the application pilot vent valve device 11 and vent valve device 12 will function to limit the reduction in brake pipe pressure in the same manner as when the brake valve 18 is in the first application position in the service application zone. This is also the case with the charging valve device 10 and brake controlling valve mechanism.

It will be seen that, if desired, the brake cylinder pressure may be increased in light steps or graduations by sequentially connecting each of the charged application reservoirs 150 to the piston chamber 19 of the application pilot vent valve device 11, or may be increased in heavier graduations by moving the brake valve 18 quickly to connect two or more of the reservoirs to the chamber 19 for each graduation. If it is desired to effect a full service application of the brakes, the brake valve 18 is quickly moved to the position in which all of the charged application reservoirs are connected to the piston chamber 19. The volumes of the reservoirs are so proportioned, that when they are all connected to the chamber 19, the valve devices 11 and 12 will be caused to function to effect a full service reduction (twenty pounds) in brake pipe pressure; that is to say, the volume of each reservoir is such that fluid under pressure vented therefrom to the chamber 19 will cause the valve devices 11 and 12 to function to effect a reduction in brake pipe pressure slightly in excess of two pounds.

It will be noted that when one or more application reservoirs 150 have been vented through the medium of the valve device 11, the pressure of fluid in the next application reservoir cut into operation, will equalize into the already vented application reservoir or reservoirs, as the case may be, and in order to prevent this from varying the amount of fluid under pressure supplied to the chamber 19, the volumes of the application reservoirs vary according to the order in which they are adapted to be connected with the piston chamber 19; that is to say, the volume of the first reservoir is the smallest, the second slightly larger than the first and so on down to the last reservoir which has the largest volume. By reason of this, fluid under pressure from each reservoir 150 will cause a uniform reduction in brake pipe pressure to be effected.

It will be noted that all of the application reservoirs 150 are connected with the piston chamber 19 of the application pilot vent valve device 11 when the brake valve 18 is in the next to the last position in the service application zone, and if the brake valve is permitted to remain in this position long enough, a full service application of the brakes is adapted to be effected.

If, when the brake valve 18 is moved to any of the reservoir connecting positions in the service application zone, the vent valve device 11 should, for any reason, fail to function to vent fluid under pressure from the brake pipe, the operator will move the brake valve to the last position in the service application zone, in which fluid under pressure is vented from the brake pipe to the atmosphere independently of the vent valve device 11, by way of pipe 133, a cavity 176 in the brake valve 18 and pipe 152 leading to the atmosphere. If the brake valve 18 is permitted to remain in this position long enough, a full service application of the brakes is adapted to be effected.

When in effecting a service application of the brakes, the brake cylinder pressure is increased to about the maximum pressure that can be obtained, fluid at brake cylinder pressure in chamber 140 of the cut-off valve device 15 causes the valve 139 to be unseated and the valve 142 to be seated against the opposing pressure of the spring 144. With the valve 142 seated, the atmospheric communication from the diaphragm chamber 138 is closed. With the valve 139 unseated fluid at brake cylinder pressure flows from chamber 140 to diaphragm chamber 138 and causes the diaphragm 134 to flex so as to seat the diaphragm valve 129, said valve when seated closing communication between the chamber 130 and the chamber 132 and thereby preventing any further reduction in brake pipe pressure, while the brake cylinder pressure is high enough to keep the valve 139 unseated, unless the brake valve 18 is moved to emergency position. This prevents any unnecessary venting of fluid from the brake pipe when a full service application of the brakes has been effected.

When, in effecting a service application of the brakes, the rate of retardation of the train is great enough to cause the member 120 of the retardation controller valve device 17 to engage a stop 177 on the casing of the device, the slide valve 126 will have been moved, by the member acting through the medium of the lever 121 and plunger 125, to a position in which the cavity 148 connects the brake pipe passage 147 with a passage 178 leading from the pipe 118 and the cavity 155 connects the passage 154 to a passage 179 leading to the atmosphere. With the slide valve in this position, the passage 131, through which fluid under pressure is adapted to be vented from the brake pipe, is lapped, and the passage 128, through which fluid is adapted to be supplied to the release pipe 5, is lapped.

With the cavity 148 connecting the passage 147 and 178, fluid under pressure flows from the pipe 118 to the brake pipe 4 and from thence flows by way of the open cut-out cock 6 and pipe and passage 50 to the equalizing piston chamber 49. From the passage 50, fluid under pressure flows through pipe 79, check valve 80 and pipes 81 and 77 to the supply reservoir 7 and supply chamber 76 of the application and release valve device 47.

Fluid under pressure supplied to the equalizing piston chamber 49 causes the equalizing piston 48 and piston stem 53, and thereby the auxiliary and main slide valves 55 and 54, respectively, to move to release position, in which fluid under pressure is supplied to the auxiliary reservoir 9 and equalizing valve chamber 56 by way of the feed passage 62, and in which the passage 69, leading from the volume reservoir 45 and piston chamber 67, is connected by the cavity 156 in the equalizing main slide valve 54 to the release passage 100.

Further, with the cavity 155 connecting the passage 154 to the passage 179, fluid under pressure is vented from the release pipe 5, and since the pipe 96 is connected with the release pipe, fluid under pressure is also vented from the diaphragm chamber 95 of the release transmitter vent valve device 14. The reduction in the pressure of fluid in the chamber due to such venting permits the fluid under pressure in the diaphragm chamber 97 to flex the diaphragm upwardly against the opposing pressure of the spring 106 a sufficient distance to unseat the vent valve 102. Since the passage 100 is connected to both the passage 96 and passage 99, fluid under pressure is vented from the piston chamber 67 of the application and release valve device by way of both the retardation controller valve device and vent valve device 14, until such time as the pressure of fluid in the diaphragm chamber 97 of the vent valve device 14 is reduced to substantially the reducing pressure of fluid in chamber 95 when the spring 106 acts to seat the vent valve 102. With this valve seated, the flow of fluid from the volume reservoir 45 and piston chamber 67 continues by way of the retardation controller valve device.

With the chamber 67 of the application and release valve device 47 thus connected to the atmosphere, the pressure of fluid in the valve chamber 72 causes the piston 66, and thereby the valve 71, to move to release position, in which fluid under pressure is vented from the brake cylinder 16 by way of pipe and passage 73, valve chamber 72 of the application and release valve device and passage 74, thus reducing the brake cylinder pressure and consequently the braking force of the equipment, which, of course, effects a change in the rate of retardation of the train.

It will be noted that when the member 120 moves forwardly from the position in which it is shown in the drawing, it first laps the passage 131, thereby closing communication from the brake pipe to the brake valve 18, then the cavity 148 in the valve connects the passages 178 and 147, thereby establishing communication through which fluid at feed valve pressure is supplied to the brake pipe, and finally the cavity 155 connects the passages 154 and 179, thereby establishing the release communication from the release pipe 5 to the atmosphere. From this it will be seen that the several parts of the equalizing valve device will be moved to release position and thereby establish communication from the volume reservoir 45 and piston chamber 67 of the application and release valve device to the seat for the control slide valve 126 before this communication is connected to the atmosphere. By thus conditioning the equalizing valve device prior to the release of fluid under pressure from the volume reservoir 45 and piston chamber 67, a much quicker release action is provided than would be the case if the parts of the equalizing valve device were permitted to remain in application position or application lap position until the communication from the pipe 118 to the brake pipe were established.

As the brakes are being released under the control of the retardation controller valve device, the rate of retardation of the train changes and, of course, the force of the member 120, acting on the compressed spring 127 through the medium of the lever 121 and plunger 125, diminishes and the spring acts to move the plunger and thereby the slide valve forwardly, lapping the passages 179 and 154, thereby cutting off communication from the release pipe 5 and consequently from the piston chamber 67 to the atmosphere. With this communication closed, the application and release valve device 47 functions to cut off the flow of fluid from the brake cylinder to the atmosphere. Now when the rate of retardation becomes great enough to again move the member 120 into engagement with the stop 177, the application and release valve device will be caused to function to release fluid under pressure from the brake cylinder. It is obvious from the above that the member 120 and spring 127 will move the slide valve back and forth between release and lap positions according to the rate of retardation of the train and thereby cause the equipment to function to limit the rate of retardation of the train to a maximum value.

It is well known that as the train decelerates, the coefficient of friction between the contacting or rubbing parts of the brakes, such for instance as the brake shoes and wheels, will increase, and unless the brake cylinder pressure is decreased, the rate of retardation of the train will increase. Therefore, after the retardation controller device 17 has taken control of the brakes, its principal function is to so control the pressure of fluid in the chamber 67 of the application and release valve device 47 as to cause said device to function to decrease brake cylinder pressure substantially in accordance with the increase of the coefficient of friction between the rubbing parts of the brakes.

If, when the brake valve 18 is in the last position in the service application zone, the decrease in brake cylinder pressure is such that the change in the rate of deceleration of the train will permit the parts of the retardation controller valve device to move so as to connect the passages 131 and 147 and passages 128 and 154, fluid under pressure will be vented from the brake pipe, and as a consequence, the several parts of the brake controlling valve device 8 will function to supply fluid under pressure to the brake cylinder and thus increase the brake cylinder pressure. If the brake valve is in any intermediate position in the service application zone and the parts of the retardation controller valve device move to the position just mentioned, an increase in brake cylinder pressure may be obtained by advancing the brake valve 18 to another position in the service application zone.

*Emergency application of the brakes*

When the brake valve 18 is moved to emergency position, a cavity 185 in the valve connects the pipe 146 to the pipe 152 leading to the atmosphere. Since the pipe 146 is in direct communication with the pipe 131, which is connected through cavity 148 in the retardation controller slide valve 126 and passage and pipe 147 to the brake pipe 4, fluid under pressure is now vented from the brake pipe to the atmosphere without limitation by the cut-off valve device 15. The cavity 174 in the brake valve connects the pipes 175 and 109 in the same manner as in effecting a service application, so that the charging valve device will be caused to function to effect the charging of the release pipe according to brake cylinder pressure.

It will be understood that in effecting an emergency application of the brakes, that since the cut-off valve device cannot limit the reduction in brake pipe pressure, the brake cylinder pressure may be increased to the maximum pressure obtainable.

It will also be understood that the retardation controller valve device will function in substantially the same manner as in effecting a service application of the brakes, to control brake cylinder pressure and thereby the rate of retardation of the train.

*Release of the brakes through the medium of the brake valve device*

To effect the release of the brakes following either a service or an emergency application, the brake valve 18 is first moved from emergency position or a service application position, as the case may be, to charging position, in which the application reservoirs 150 are fully charged, and in which the brake pipe 4 is supplied with fluid under pressure from the pipe 118 leading from the feed valve device 2. Fluid under pressure thus supplied to the brake pipe flows therefrom to the supply reservoir 7 and equalizing piston chamber 49, and if the equalizing piston 48 and associated slide valves 54 and 55 are not in their release positions, the increase in the pressure of fluid in chamber 49 will cause them to move to this position and the auxiliary reservoir 9 and equalizing piston chamber 56 will be recharged by way of the passage 62.

With several parts of the equalizing valve device in release position, even though the cavity 156 connects the passage 69, leading from the volume reservoir 45 and piston chamber 67 of the application and release valve device, to the release passage 100, a release of fluid under pressure from this reservoir and chamber does not occur, provided the slide valve of the retardation controller valve device is not in position to release fluid under pressure from the release pipe 5, for the reason that the release valve 102 of the release transmitter valve device 14 will be seated.

Now, when the brake valve 18 is moved from charging position to the adjacent release position in the release zone, fluid under pressure is supplied from the first release reservoir 149 to the piston chamber 31 of the release pilot valve device 13 by way of cavity 162 in the brake valve and passage and pipe 32. Fluid under pressure thus supplied to the chamber 31 causes the relay piston 33 to move and unseat the vent valve 35. With the vent valve unseated, fluid under pressure flows from the release pipe to the atmosphere by way of pipes 43 and 37, vent valve chamber 36, chamber 38 and passage 39.

When the valve 35 has been unseated, the piston 33 uncovers the passage 163 to the piston chamber 31, so that fluid under pressure flows from the chamber to the atmosphere. Now, when the pressure of the chamber has been reduced by such flow to substantially that of the atmosphere, the compressed spring acts to seat the valve 35 and to return the piston to its normal position, thus effecting a limited reduction in release pipe pressure.

This reduction in release pipe pressure is also effective in the diaphragm chamber 95 of the release valve device 14, and as a consequence, fluid under pressure in chamber 97 causes the flexible diaphragm 94 to function to unseat the release valve 102. Fluid under pressure now flows from the volume chamber 45 and connected piston chamber 67 to the atmosphere by way of passage 69, cavity 156 of the equalizing main slide valve 54, passage 100, restricted passage 99, release valve chamber 101 and passage 104. Fluid under pressure flows from the diaphragm chamber 97 through the restricted passage 98 to the passage 99 and when, due to such flow, the pressure of fluid in this chamber has been reduced to substantially the pressure of fluid in diaphragm chamber 95, the spring 106, acting through the medium of the diaphragm 94 and stem 103, causes the valve 102 to seat, thus cutting off the release flow of fluid from the volume reservoir 45 and piston chamber 67. Since the passage 100 is in communication with the release pipe 5 by way of passage and pipe 96, the valve device 14 on each car of the train functions to effect a limited local reduction in release pipe pressure.

The reduction in the pressure of fluid in the volume reservoir 45 and piston chamber 67 permits fluid under pressure in the valve chamber 72 to move the piston and thereby the slide valve 71 to uncover the atmospheric passage 74, so that fluid under pressure is vented from the brake cylinder to the atmosphere. When, due to the flow of fluid from the chamber 72 to the atmosphere, the pressure of fluid in the chamber is reduced slightly below the pressure of fluid in the piston chamber 67, the piston 66 will function to move the slide valve 71 to cover the passage 74 so as to cut off the flow of fluid from the brake cylinder to the atmosphere.

If another step release of brake cylinder pressure is desired, the brake valve 18 is moved to the next release position in the release zone and so on down to the next to the last release position in the release zone when substantially the complete release of brake cylinder pressure is obtained. It is possible that after the release reservoirs have been vented in the next to the last release position of brake valve 18, there may still be a small amount of fluid under pressure trapped in the release pipe 5 and consequently in the brake cylinder, and in order to insure the complete release of fluid from the brake cylinder, the brake valve is moved to full release position, in which the release pipe is connected directly to the atmosphere by way of pipes 43 and 37, tail 153 of cavity 151 in the brake valve, cavity 151 and pipe 152. With the release pipe thus completely vented, the several parts of the application and release valve device 47 will remain in their release position, in which the brake cylinder is in open communication with the atmosphere.

It will be noted from the foregoing description that the brakes are adapted to be released at any time, regardless of the position of the slide valve 126 of the retardation controller valve device 17.

If it is desired to cut out the brakes on a particular car of the train, the plug valve 52 of the cut-out cock device 6 is turned, through the medium of an operating handle, a sufficient distance to cut off the communication from the brake pipe to the pipe 50. This renders the equalizing valve device 46 and application and release valve device 47 ineffective to control the brakes. It will, however, be understood that the transmitter valve devices 12 and 14 will function in the same manner as when the plug valve 52 is in its cut-in position, so that the rate at which either a brake pipe reduction or a release pipe reduction is transmitted through the train will not be retarded.

In cases where it is desired to have the operator control the brakes by the use of the brake valve device 3, the retardation controller valve device 17 may be omitted, and when this is done, the pipe 131 may be directly connected to the pipe 147 leading to the brake pipe 4, the pipe 129 connected directly to the pipe 154 leading to the release pipe 5 and omitting the pipe 178.

While two illustrative embodiments of our invention have been described in detail, it is not our intention to limit its scope to these embodiments or otherwise than by the terms of the appended claims.

Having now described our invention, what we claim as new and desire to secure by Letters Patent, is:

1. In a vehicle fluid pressure brake, in combination, a brake pipe, a release pipe adapted to be charged with fluid under pressure in response to an application of the brakes, a brake controlling valve mechanism comprising a valve device operated upon a reduction in brake pipe pressure for supplying fluid under pressure to effect an application of the brakes and operated upon an increase in brake pipe pressure to establish a communication through which fluid under pressure is adapted to be released to effect a release of the brakes, said valve mechanism also comprising valve means operative upon a reduction in release pipe pressure for effecting the release of fluid under pressure by way of said communication, and means operative to vary the pressures of fluid in the brake pipe and release pipe for controlling the operation of the brake controlling valve mechanism.

2. In a fluid pressure brake, in combination, a brake pipe, a release pipe adapted to be charged with fluid under pressure in response to an application of the brakes, a release control valve device having a control chamber connected to the release pipe, a reduction in fluid pressure in which chamber is adapted to effect the operation of the device to effect the release of the brakes, a brake controlling valve device operated upon a reduction in brake pipe pressure for effecting an application of the brakes and operated upon an increase in brake pipe pressure for establishing a communication through which the reduction in pressure in the release pipe effects the release of the brakes, and means for releasing fluid under pressure from the release pipe and thereby from said chamber.

3. In a fluid pressure brake, in combination, a release pipe, valve means having a control chamber connected to the release pipe a reduction in fluid pressure in which chamber is adapted to effect the operation of the valve means to effect the release of the brakes, a valve device operated by an increase in fluid pressure for releasing fluid from the release pipe and thereby from said chamber, a plurality of reservoirs normally charged with fluid under pressure, and a manually operable valve device having positions for supplying fluid under pressure from one or more of said reservoirs to said valve device.

4. In a fluid pressure brake, in combination, a brake pipe, a release pipe adapted to be charged with fluid under pressure in response to an application of the brakes, a reduction in fluid pressure in which latter pipe effects the release of the brakes, a brake controlling valve device operated upon a reduction in brake pipe pressure for effecting an application of the brakes and operable upon an increase in brake pipe pressure for establishing a communication through which the reduction in pressure in the release pipe effects the release of the brakes and manually operated means for effecting an increase in brake pipe pressure and a reduction in pressure in said release pipe.

5. In a fluid pressure brake, in combination, a brake pipe, a release pipe adapted to be charged with fluid under pressure in response to an application of the brakes, a reduction in pressure in which latter pipe effects the release of the brakes, a brake controlling valve device operated upon a reduction in brake pipe pressure for effecting an application of the brakes, and manually controlled means operable to effect a reduction in brake pipe pressure and an increase in pressure in said release pipe and operable to effect an increase in brake pipe pressure and a reduction in pressure in said release pipe.

6. In a fluid pressure brake, in combination, a brake pipe, a release pipe adapted to be charged with fluid under pressure only after the brakes are applied, a reduction in pressure in which latter pipe effects the release of the brakes, a brake controlling valve device operated upon a reduction in brake pipe pressure for effecting an application of the brakes, and operable upon an increase in brake pipe pressure to establish a communication through which fluid released from said release pipe effects the release of the brakes, and manually controlled means having one position in which a reduction in brake pipe pressure and an increase in fluid pressure in the release pipe is effected and another position in which an increase in brake pipe pressure and a reduction in fluid pressure in the release pipe is effected.

7. In a vehicle fluid pressure brake, in combination, a brake pipe, a release pipe adapted to be charged with fluid under pressure in response to an application of the brakes, a brake controlling valve mechanism comprising valve means operated upon a reduction in brake pipe pressure for supplying fluid under pressure to effect an application of the brakes and operated upon an increase in brake pipe pressure to establish a communication through which fluid under pressure is adapted to be released to effect a release of the brakes, said valve mechanism also comprising a valve device operative upon a reduction in release pipe pressure for controlling the release of fluid under pressure through said communication, and manually operative means for varying the pressures of fluid in the brake pipe and release pipe for controlling the operation of said valve means and valve device.

8. In a vehicle fluid pressure brake, in combination, a brake pipe, a release pipe adapted to be charged with fluid under pressure in response to an application of the brakes, a brake controlling valve mechanism comprising valve means operated upon a reduction in brake pipe pressure for supplying fluid under pressure to effect an application of the brakes and operated upon an increase in brake pipe pressure for establishing a communication through which fluid under pressure is adapted to be released to effect a release of the brakes, said valve mechanism also comprising a valve device operative upon a reduction in release pipe pressure for controlling the release of fluid under pressure through said communication, and a brake valve device operative to vary the pressures of fluid in the brake pipe and release pipe for controlling the operation of said valve means and valve device.

9. In a vehicle fluid pressure brake, in combination, a brake pipe, a release pipe, a brake controlling valve mechanism comprising means operated upon a reduction in brake pipe pressure for supplying fluid under pressure to effect an application of the brakes and operated upon an increase in brake pipe pressure for establishing a communication through which fluid under pressure is adapted to be released to effect a release of the brakes, said mechanism also comprising means operative upon a reduction in release pipe pressure for controlling the release of fluid under pressure by way of said communication, manually operative means for varying the pressures of fluid in said pipes for controlling the operation of the brake controlling valve mechanism, and means operative automatically to vary the pressures in said pipes to effect the operation of the brake controlling valve mechanism to release the brakes.

10. In a vehicle fluid pressure brake, in combination, a brake pipe, a release pipe, a brake controlling valve mechanism comprising valve means operated upon a reduction in brake pipe pressure for supplying fluid under pressure to effect an application of the brakes and operated upon an increase in brake pipe pressure to establish a communication through which fluid under pressure is adapted to be released to effect a release of the brakes, said mechanism also comprising means operative upon a reduction in release pipe pressure for controlling said communication, manually operative means for varying the pressures of fluid in said pipes for controlling the operation of the brake controlling valve mechanism, and means operative automatically according to the rate of deceleration of the vehicle to vary the pressures in said pipes for effecting the operation of the brake controlling valve mechanism to control the release of the brakes.

11. In a vehicle fluid pressure brake, in combination, a brake pipe, a release pipe, a brake controlling valve mechanism comprising a combined application and release valve means and a release valve device, said means and device operating upon a reduction in brake pipe pressure for supplying fluid under pressure to effect an application of the brakes and operating upon an increase in brake pipe pressure and a reduction in release pipe pressure for releasing fluid under pressure to effect a release of the brakes, manually operative means for varying the pressures of fluid in said pipes for controlling the operation of the brake controlling valve mechanism, and means operative automatically according to the rate of deceleration of the vehicle to supply fluid under pressure to the brake pipe and to release fluid under pressure from the release pipe for effecting the operation of the brake controlling valve mechanism to effect a release of the brakes, the last mentioned means when in position to effect a release of the brakes rendering the manually operative means ineffective to effect a reduction in brake pipe pressure.

12. In a vehicle fluid pressure brake, in combination, a brake pipe, a release pipe, a brake controlling valve mechanism comprising a combined application and release valve means and a release valve device, said means and device operating upon a reduction in brake pipe pressure for supplying fluid under pressure to effect an application of the brakes and operating upon an increase in brake pipe pressure and a reduction in release pipe pressure for releasing fluid under pressure to effect a release of the brakes, manually operative means for varying the pressures of fluid in said pipes for controlling the operation of the brake controlling valve mechanism, and means operative automatically according to the rate of deceleration of the vehicle to first supply fluid under pressure to the brake pipe to condition the brake controlling valve mechanism for effecting a release of the brakes and to then release fluid under pressure from the release pipe to effect the operation of the brake controlling valve mechanism to effect a release of the brakes.

13. In a vehicle fluid pressure brake, in combination, a brake pipe, a release pipe, a brake controlling valve mechanism comprising a combined application and release valve means and a release valve device, said means and device operating upon a reduction in brake pipe pressure for supplying fluid under pressure to effect an application of the brakes and operating upon an increase in brake pipe pressure and a reduction in release pipe pressure for releasing fluid under pressure to effect a release of the brakes, manually operative means for varying the pressures of fluid in said pipes for controlling the operation of the brake controlling valve mechanism, and means operative automatically according to the rate of deceleration of the vehicle to first supply fluid under pressure to the brake pipe to condition the brake controlling valve mechanism for effecting a release of the brakes and to then release fluid under pressure from the release pipe to effect the operation of the brake controlling valve mechanism to effect a release of the brakes, the last mentioned means when in position to supply fluid under pressure to the brake pipe rendering the manually operative means ineffective to effect a reduction in brake pipe pressure.

14. In a fluid pressure brake, in combination, a normally charged brake pipe, a normally vented release pipe, a brake controlling valve mechanism operative upon a reduction in brake pipe pressure for supplying fluid under pressure to effect an application of the brakes, means operative upon the initiation of an application of the brakes to supply fluid under pressure to the release pipe, said brake controlling valve mechanism being operative upon an increase in brake pipe pressure and a reduction in release pipe pressure for releasing fluid under pressure to effect a release of the brakes, and a brake valve device movable to an application position for effecting a reduction in brake pipe pressure and movable to a release position for effecting an increase in brake pipe pressure and a reduction in release pipe pressure.

15. In a fluid pressure brake, in combination, a normally charged brake pipe, a normally vented release pipe, a brake controlling valve mechanism operative upon a reduction in brake pipe pressure for supplying fluid under pressure to effect an application of the brakes, means operative according to the pressure of fluid supplied by the brake controlling valve mechanism to supply fluid under pressure to the release pipe, said brake controlling valve mechanism being operative upon an increase in brake pipe pressure and a reduction in release pipe pressure for releasing fluid under pressure to effect a release of the brakes, and a brake valve device movable to an application position for effecting a reduction in brake pipe pressure and movable to a release position for effecting an increase in brake pipe pressure and a reduction in release pipe pressure.

16. In a fluid pressure brake, in combination, a normally charged brake pipe, a normally vented release pipe, a brake controlling valve mechanism operative upon a reduction in brake pipe pressure for supplying fluid under pressure to effect an application of the brakes, means responsive to the pressure of fluid supplied by the brake controlling valve mechanism to supply fluid under pressure to the release pipe, said brake controlling valve mechanism being operative upon an increase in brake pipe pressure and a reduction in release pipe pressure for releasing fluid under pressure to effect a release of the brakes, and a brake valve device movable to an application position for effecting a reduction in brake pipe pressure and movable to a release position for effecting an increase in brake pipe pressure and a reduction in release pipe pressure.

17. In a fluid pressure brake, in combination, a normally charged brake pipe, a normally vented release pipe, a brake controlling valve mechanism operative upon a reduction in brake pipe pressure for supplying fluid under pressure to effect an application of the brakes, a normally closed valve operative to admit fluid under pressure to the release pipe, means subject to the pressure of fluid supplied by the brake controlling valve mechanism for operating said valve, said brake controlling valve mechanism being operative upon an increase in brake pipe pressure and a reduction in release pipe pressure for releasing fluid under pressure to effect a release of the brakes, and a brake valve device movable to an application position for effecting a reduction in brake pipe pressure and movable to a release position for effecting an increase in brake pipe pressure and a reduction in release pipe pressure.

18. In a fluid pressure brake, in combination, a normally charged brake pipe, a normally vented release pipe, a brake controlling valve mechanism operative upon a reduction in brake pipe pressure for supplying fluid under pressure to effect an application of the brakes, a normally closed valve operative to admit fluid under pressure to the release pipe, means subject to the pressure of fluid supplied by the brake controlling valve mechanism for actuating said valve and operative when the pressure of the release pipe is substantially equal to the pressure of fluid supplied by the brake controlling valve mechanism for cutting off the flow of fluid to the release pipe, said brake controlling valve mechanism being operative upon an increase in brake pipe pressure and a reduction in release pipe pressure for releasing fluid under pressure to effect a release of the brakes, and a brake valve device movable to an application position for effecting a reduction in brake pipe pressure and movable to a release position for effecting an increase in brake pipe pressure and a reduction in release pipe pressure.

19. In a fluid pressure brake, in combination, a normally charged brake pipe, a normally vented release pipe, a brake controlling valve mechanism operative upon a reduction in brake pipe pressure for supplying fluid under pressure to effect an application of the brakes, means operative upon the initiation of an application of the brakes to supply fluid under pressure to the release pipe, said brake controlling valve mechanism being operative upon an increase in brake pipe pressure and a reduction in release pipe pressure for releasing fluid under pressure to effect a release of the brakes, a brake valve device movable to an application position for effecting a reduction in brake pipe pressure and movable to a release position for effecting an increase in brake pipe pressure and a reduction in release pipe pressure, and means operative automatically according to the rate of retardation of the vehicle for effecting the operation of the brake controlling valve mechanism to effect a release of the brakes.

20. In a fluid pressure brake, in combination, a normally charged brake pipe, a normally vented release pipe, a brake controlling valve mechanism operative upon a reduction in brake pipe pressure for supplying fluid under pressure to effect an application of the brakes, means operative upon the initiation of an application of the brakes to supply fluid under pressure to the release pipe, said brake controlling valve mechanism being operative upon an increase in brake pipe pressure and a reduction in release pipe pressure for releasing fluid under pressure to effect a release of the brakes, a brake valve device movable to an application position for effecting a reduction in brake pipe pressure and movable to a release position for effecting an increase in brake pipe pressure and a reduction in release pipe pressure, and valve means operative automatically according to the rate of retardation of the vehicle for effecting an increase in brake pipe pressure and a reduction in release pipe pressure.

21. In a fluid pressure brake, in combination, a normally charged brake pipe, a normally vented release pipe, a brake controlling valve mechanism operative upon a reduction in brake pipe pressure for supplying fluid under pressure to effect an application of the brakes, means operative upon the initiation of an application of the brakes to supply fluid under pressure to the release pipe, said brake controlling valve mechanism being operative upon an increase in brake pipe pressure and a reduction in release pipe pressure for releasing fluid under pressure to effect a release of the brakes, a brake valve device movable to an application position for effecting a reduction in brake pipe pressure and movable to a release position for effecting an increase in brake pipe pressure and a reduction in release pipe pressure, and means operative when the rate of retardation of the vehicle approaches an excessive degree for effecting an increase in brake pipe pressure and a reduction in release pipe pressure.

22. In a vehicle fluid pressure brake, in combination, a brake pipe, a release pipe, a brake controlling valve mechanism operated upon a reduction in brake pipe pressure for supplying fluid under pressure to effect an application of the brakes and operated upon an increase in brake pipe pressure and a reduction in release pipe pressure for releasing fluid under pressure to effect a release of the brakes, manually operative means for varying the pressures of fluid in said pipes for controlling the operation of the brake controlling valve mechanism, and means operative automatically, when the rate of retardation tends to become excessive, for varying the pressures of the brake pipe and release pipe to effect the operation of the brake controlling valve mechanism to release the brakes.

23. In a vehicle fluid pressure brake, in combination, a brake pipe, a release pipe, a brake controlling valve mechanism operated upon a reduction in brake pipe pressure for supplying fluid under pressure to effect an application of the brakes and operated upon an increase in brake pipe pressure and a reduction in release pipe pressure for releasing fluid under pressure to effect a release of the brakes, manually operative means for varying the pressures of fluid in said pipes for controlling the operation of the brake controlling valve mechanism, and means operative automatically, when the rate of retardation tends to become excessive, to first render the brake valve device ineffective to effect a reduction in brake pipe pressure, to then increase brake pipe pressure to condition the brake controlling valve mechanism for effecting a release of the brakes and to then effect a reduction in release pipe pressure to cause the brake controlling valve mechanism to effect a release of the brakes.

24. In a fluid pressure brake, in combination, a brake pipe, a brake controlling valve mechanism operated upon a reduction in brake pipe pressure for supplying fluid under pressure to effect an application of the brakes, a brake valve device operative to effect a reduction in brake pipe pressure, and means interposed between the brake pipe and the brake valve device operative by fluid under pressure supplied by the brake controlling valve mechanism for limiting the reduction in brake pipe pressure.

25. In a fluid pressure brake, in combination, a brake pipe, a brake cylinder, a brake controlling valve mechanism operated upon a reduction in brake pipe pressure for supplying fluid under pressure to the brake cylinder, a brake valve device operative to vent fluid under pressure to effect a reduction in brake pipe pressure, a normally open valve past which fluid under pressure vented from the brake pipe is adapted to flow, and means operable according to the pressure of fluid supplied to the brake cylinder by said brake controlling valve mechanism for actuating said valve to cut off the flow of fluid from the brake pipe.

26. In a fluid pressure brake, in combination, a brake pipe, a brake cylinder, a brake controlling valve mechanism operated upon a reduction in brake pipe pressure for supplying fluid under pressure to the brake cylinder, a brake valve device operative to vent fluid under pressure to effect a reduction in brake pipe pressure, a normally open valve past which fluid under pressure vented from the brake pipe is adapted to flow, and means operable by fluid at brake cylinder pressure supplied by said brake controlling valve mechanism, when the brake cylinder pressure approaches the maximum pressure obtainable, to actuate said valve to cut off the flow of fluid from the brake pipe.

27. In a fluid pressure brake for a vehicle, in combination, a brake pipe, a brake cylinder, a brake controlling valve mechanism operated upon a reduction in brake pipe pressure for supplying fluid under pressure to the brake cylinder, a brake valve device having a service application position in which fluid under pressure is vented from the brake pipe through one communication and having an emergency position in which fluid under pressure is vented from the brake pipe through another communication, and means operative according to a certain brake cylinder pressure and only when the brake valve device is in service position for cutting off the flow of fluid from the brake pipe through the first mentioned communication.

28. In a fluid pressure brake for a vehicle, in combination, a brake pipe, a brake cylinder, a brake controlling valve mechanism operated upon a reduction in brake pipe pressure for supplying fluid under pressure to the brake cylinder, a brake valve device having a service application position in which fluid under pressure is vented from the brake pipe through one communication and having an emergency position in which fluid under pressure is vented from the brake pipe through another communication, means operative according to a certain brake cylinder pressure and only when the brake valve device is in service position for cutting off the flow of fluid from the brake pipe by way of the first mentioned communication, and means operative according to the rate of retardation of the vehicle for cutting off the flow of fluid from the brake pipe by way of either of said communications.

29. In a fluid pressure brake, in combination, a brake pipe, a brake cylinder, a brake valve device operative to a service position to effect a reduction in brake pipe pressure, a brake controlling valve mechanism operated upon the reduction in brake pipe pressure for supplying fluid under pressure to the brake cylinder, and means operative, when the brake valve device is in a service position and the brake cylinder pressure increased to substantially the maximum pressure obtainable, for preventing a further reduction in brake pipe pressure.

30. In a fluid pressure brake, in combination, a brake pipe, a brake controlling valve mechanism operative upon a reduction in brake pipe pressure to effect an application of the brakes, valve means operative to effect a reduction in brake pipe pressure including a valve device operative by fluid under pressure to initiate the reduction in brake pipe pressure, a plurality of reservoirs normally charged with fluid under pressure, and a brake valve device operative in an application zone for successively cutting said reservoirs into communication with said valve device to effect the operation of the valve device.

31. In a fluid pressure brake, in combination, a brake pipe, a brake controlling valve mechanism operative upon a reduction in brake pipe pressure to effect an application of the brakes, valve means operative to effect a reduction in brake pipe pressure including a valve device operative by fluid under pressure to initiate the reduction in brake pipe pressure, a plurality of reservoirs normally charged with fluid under pressure, and a brake valve device operative in an application zone for successively cutting said reservoirs into communication with said valve device to effect the operation of the valve device and being adapted in the last position in the application zone to connect the brake pipe to the atmosphere independently of said valve device.

32. In a fluid pressure brake, in combination, a brake pipe, a brake controlling valve mechanism operative upon a reduction in brake pipe pressure to effect an application of the brakes, valve means adapted to be operated by fluid under pressure to effect a reduction in brake pipe pressure, means for venting the actuating fluid from the valve means for causing the valve means to function to limit the brake pipe reduction according to the amount of actuating fluid supplied thereto, a plurality of reservoirs normally charged with fluid under pressure, and a brake valve device operative in an application zone for supplying fluid under pressure from said reservoirs, successively, to the valve means to cause the valve means to function to reduce brake pipe pressure in steps.

33. In a fluid pressure brake, in combination, a brake pipe, a brake controlling valve mechanism operative upon a reduction in brake pipe pressure to effect an application of the brakes, valve means adapted to be operated by fluid under pressure to effect a reduction in brake pipe pressure, means for venting the actuating fluid from the valve means for causing the valve means to function to limit the brake pipe reduction according to the amount of actuating fluid supplied thereto, a plurality of reservoirs normally charged with fluid under pressure, and a brake valve device operative in an application zone for supplying fluid under pressure from said reservoir, successively, to the valve means to cause the valve means to function to reduce brake pipe pressure in uniform increments.

34. In a fluid pressure brake, in combination, a brake pipe, a brake controlling valve mechanism operative upon a reduction in brake pipe pressure to effect an application of the brakes, valve means adapted to be operated by fluid under pressure to effect a reduction in brake pipe pressure, means for venting the actuating fluid from the valve means for causing the valve means to function to limit the brake pipe reduction according to the amount of actuating fluid supplied thereto, a plurality of reservoirs normally charged with fluid under pressure, and a brake valve device operative in an application zone for supplying fluid under pressure from said reservoirs, successively, to the valve means to cause the valve means to function to reduce brake pipe pressure in uniform increments and being adapted in the last position in the application zone to effect a continuous reduction in brake pipe pressure regardless of the operation of said valve device.

35. In a fluid pressure brake, in combination, a brake pipe, a brake controlling valve mechanism operative upon a reduction in brake pipe pressure to effect an application of the brakes, valve means adapted to be operated by fluid under pressure to effect a reduction in brake pipe pressure, means for venting the actuating fluid from the valve means for causing the valve means to function to limit the brake pipe reduction according to the amount of actuating fluid supplied thereto, a plurality of reservoirs normally charged with fluid under pressure, a brake valve device operative in an application zone for supplying fluid under pressure from said reservoirs, successively, to the valve means to cause the valve means to function to reduce brake pipe pressure in steps, and means operative automatically to limit the degree of the continuous reduction in brake pipe pressure.

36. In a fluid pressure brake, in combination, a brake pipe, a brake controlling valve mechanism operative upon a reduction in brake pipe pressure to effect an application of the brakes, valve means adapted to be operated by fluid under pressure to effect a reduction in brake pipe pressure, means for venting the actuating fluid from the valve means for causing the valve means to function to limit the brake pipe reduction according to the amount of actuating fluid supplied thereto, a plurality of reservoirs normally charged with fluid under pressure, and a brake valve device operative in an application zone to supply fluid under pressure from said reservoirs, successively, to the valve means to cause the valve means to function to reduce brake pipe pressure in uniform increments and being adapted in the last position in the application zone to effect an uninterrupted reduction in brake pipe pressure an amount at least equal to that effected by said valve means when all of said reservoirs are connected thereto.

37. In a fluid pressure brake, in combination, a brake pipe, a release pipe, a brake controlling valve mechanism comprising a combined application and release valve means and a release valve device, said means and device operating upon a reduction in brake pipe pressure to effect an application of the brakes and operating upon an increase in brake pipe pressure and a reduction in release pipe pressure for effecting a release of the brakes, a brake valve operative in a brake application position for effecting a reduction in brake pipe pressure and operative in a brake releasing position for effecting an increase in brake pipe pressure and a reduction in release pipe pressure.

38. In a fluid pressure brake, in combination, a brake pipe, a release pipe, a brake controlling valve mechanism operated upon a reduction in brake pipe pressure to effect an application of the brakes and operated upon an increase in brake pipe pressure to a preliminary release position and operated upon a reduction in release pipe pressure to release position to effect the release of the brakes, a brake valve operative in a brake application position for effecting a reduction in brake pipe pressure and operative in a charging position for increasing brake pipe pressure and operative in a release position for effecting a reduction in release pipe pressure.

39. In a fluid pressure brake, in combination, a brake pipe, a release pipe, a brake controlling valve mechanism operated upon a reduction in brake pipe pressure to effect an application of the brakes and operated upon an increase in brake pipe pressure to a preliminary release position and operated upon a reduction in release pipe pressure to release position to effect the release of the brakes, a brake valve operative in a brake application position for effecting a reduction in brake pipe pressure and operative in a charging position for increasing brake pipe pressure and operative in a release position for increasing the brake pipe pressure and effecting a reduction in release pipe pressure.

40. In a fluid pressure brake, in combination, a brake pipe, a release pipe, a brake controlling valve mechanism comprising a combined application and release valve means and a release valve device, said means and valve device operating upon a reduction in brake pipe pressure to effect an application of the brakes and operating upon an increase in brake pipe pressure and a reduction in release pipe pressure for effecting a release of the brakes, valve means adapted to be operated by fluid under pressure to effect a reduction in release pipe pressure, and a plurality of reservoirs charged with fluid under pressure, a brake valve device operative to an application position for effecting a reduction in brake pipe pressure and operative in a release zone for supplying fluid under pressure to the brake pipe and for supplying fluid under pressure from said reservoirs, successively, to said valve means to cause the valve means to function to reduce release pipe pressure in steps.

41. In a fluid pressure brake, in combination, a brake pipe, a release pipe, a brake controlling valve mechanism comprising a combined application and release valve means and a release valve device, said means and valve device operating upon a reduction in brake pipe pressure to effect an application of the brakes and operating upon an increase in brake pipe pressure and a reduction in release pipe pressure for effecting a release of the brakes, valve means adapted to be operated by fluid under pressure to effect a reduction in release pipe pressure, a plurality of reservoirs charged with fluid under pressure, a a brake valve device operative to an application position for effecting a reduction in brake pipe pressure and operative in a release zone for supplying fluid under pressure to the brake pipe and for supplying fluid under pressure from said reservoirs, successively, to said valve means to cause the valve means to function to reduce release pipe pressure in uniform increments.

42. In a fluid pressure brake, in combination, a brake pipe, a release pipe, a brake controlling valve mechanism comprising a combined application and release valve means and a release valve device, said means and valve device operating upon a reduction in brake pipe pressure to effect an application of the brakes and operating upon an increase in brake pipe pressure and a reduction in release pipe pressure for effecting a release of the brakes, valve means adapted to be operated by fluid under pressure to effect a reduction in release pipe pressure, a plurality of reservoirs charged with fluid under pressure, a brake valve device operative to an application position for effecting a reduction in brake pipe pressure and operative in a release zone for supplying fluid under pressure to the brake pipe and for supplying fluid under pressure from said reservoirs, successively, to said valve means to cause the valve means to function to reduce release pipe pressure in uniform increments, said brake valve device in the last position in the release zone connecting the release pipe directly to the atmosphere.

43. In a fluid pressure brake, in combination, a brake pipe, a brake controlling valve mechanism operative to effect an application and the release of the brakes, means operative by fluid under pressure to control the operation of the brake controlling valve mechanism to effect an application of the brakes, means operative by fluid under pressure to control the operation of the brake controlling valve mechanism to effect a release of the brakes, a plurality of charged application reservoirs from which fluid under pressure is adapted to be supplied to effect the operation of the first mentioned means, a plurality of charged release reservoirs from which fluid under pressure is adapted to be supplied to effect the operation of the second mentioned means, a brake valve device operative in an application zone for successively connecting said application reservoirs to the first mentioned means and operative in a release zone for successively connecting the release reservoirs to the second mentioned means.

44. In a fluid pressure brake, in combination, a brake pipe, a brake controlling valve mechanism operative to effect an application and the release of the brakes, means operative by fluid under pressure to control the operation of the brake controlling valve mechanism to effect an application of the brakes, means operative by fluid under pressure to control the operation of the brake controlling valve mechanism to effect a release of the brakes, a plurality of charged application reservoirs from which fluid under pressure is adapted to be supplied to effect the operation of the first mentioned means, a plurality of charged release reservoirs from which fluid under pressure is adapted to be supplied to effect the operation of the second mentioned means, a brake valve device operative in an application zone for successively connecting said application reservoirs to the first mentioned means and operative in a release zone for successively connecting the release reservoirs to the second mentioned means, said brake valve device in the last position in the application zone connecting the brake pipe directly to the atmosphere and in the last position in the release zone connecting the release pipe to the atmosphere.

45. In a fluid pressure brake, in combination, a brake pipe, a brake controlling valve mechanism operative to effect an application and the release of the brakes, means operative by fluid under pressure to control the operation of the brake controlling valve mechanism to effect an application of the brakes, means operative by fluid under pressure to control the operation of the brake controlling valve mechanism to effect a release of the brakes, a plurality of charged application reservoirs from which fluid under pressure is adapted to be supplied to effect the operation of the first mentioned means, a plurality of charged release reservoirs from which fluid under pressure is adapted to be supplied to effect the operation of the second mentioned means, a brake valve device operative in an application zone for successively connecting said application reservoirs to the first mentioned means and operative in a release zone for successively connecting the release reservoirs to the second mentioned means, and operative to a charging position for charging any or all of said application reservoirs or any or all of said release reservoirs with fluid under pressure.

46. In a fluid pressure brake, a brake pipe, a brake cylinder, a release pipe, a brake controlling valve mechanism including a valve device operative by fluid under pressure to supply fluid under pressure to the brake cylinder and operative upon the release of the actuating fluid for releasing fluid under pressure from the brake cylinder and also including an equalizing valve device operated upon a reduction in brake pipe pressure for supplying fluid under pressure to actuate said valve device and operated upon an increase in brake pipe pressure to establish a communication through which fluid under pressure is adapted to be vented from said valve device, and means operative upon a reduction in release pipe pressure for connecting said communication to the atmosphere to vent fluid under pressure from said valve device.

47. In a fluid pressure brake, a brake pipe, a brake cylinder, a release pipe, a brake controlling valve mechanism including a valve device operative by fluid under pressure to supply fluid under pressure to the brake cylinder and operative upon the release of the actuating fluid for releasing fluid under pressure from the brake cylinder and also including an equalizing valve device operated upon a reduction in brake pipe pressure for supplying fluid under pressure to actuate said valve device and operated upon an increase in brake pipe pressure to establish a communication through which fluid under pressure is adapted to be vented from said valve device, means operative upon a reduction in release pipe pressure for venting fluid under pressure from said valve device by way of said communication, and a cut-out valve device operative at will to render said equalizing valve device and valve device ineffective to either supply fluid under pressure to or release fluid under pressure from the brake cylinder.

48. In a fluid pressure brake, a brake pipe, a brake cylinder, a release pipe, a brake controlling valve mechanism including a valve device operative by fluid under pressure to supply fluid under pressure to the brake cylinder and operative upon the release of the actuating fluid for releasing fluid under pressure from the brake cylinder and also including an equalizing valve device operated upon a reduction in brake pipe pressure for supplying fluid under pressure to actuate said valve device and operated upon an increase in brake pipe pressure to establish a communication through which fluid under pressure is adapted to be vented from said valve device, means operative upon a reduction in release pipe pressure for venting fluid under pressure from said valve device by way of said communication, and means operative to render the equalizing valve device and thereby said valve device ineffective to control the supply of fluid under pressure to and the release of fluid under pressure from the brake cylinder.

49. In a fluid pressure brake for a train, a brake pipe, a release pipe, a brake controlling valve mechanism on each car of the train comprising a combined application and release valve means and a release valve device, said means and valve device operating upon a reduction in brake pipe pressure for effecting an application of the brakes and operating upon an increase in brake pipe pressure and a reduction in release pipe pressure for effecting a release of the brakes, an application pilot vent valve device operative to initiate a reduction in brake pipe pressure, a transmitter valve device on each car of the train responsive to the reduction in brake pipe pressure effected by said application pilot vent valve device for effecting a local reduction in brake pipe pressure, a release pilot vent valve device operative by fluid under pressure for initiating a reduction in release pipe pressure, a transmitter valve device on each car of the train responsive to the reduction in release pipe pressure effected by the release pilot vent valve device for effecting a local reduction in release pipe pressure, a plurality of application reservoirs charged with fluid under pressure, a plurality of release reservoirs charged with fluid under pressure, and a brake valve device operative in a service application zone to establish communication through which fluid under pressure is supplied from one or more of the application reservoirs to effect the operation of the application pilot vent valve device to effect a reduction in brake pipe pressure and operative in a release zone to supply fluid under pressure to the brake pipe and to establish communication through which fluid under pressure is supplied from one or more of the release reservoirs to the release pilot vent valve device to effect the operation of the release pilot vent valve device to effect a reduction in release pipe pressure.

50. In a fluid pressure brake for a train, a brake pipe, a release pipe, a brake controlling valve mechanism on each car of the train comprising a combined application and release valve means and a release valve device, said means and valve device operating upon a reduction in brake pipe pressure for effecting an application of the brakes and operating upon an increase in brake pipe pressure and a reduction in release pipe pressure for effecting a release of the brakes, an application pilot vent valve device operative to initiate a reduction in brake pipe pressure, a transmitter valve device on each car of the train responsive to the reduction in brake pipe pressure effected by said application pilot vent valve device for effecting a local reduction in brake pipe pressure, a release pilot vent valve device operative by fluid under pressure for initiating a reduction in release pipe pressure, a transmitter valve device on each car of the train responsive to the reduction in release pipe pressure effected by the release pilot vent valve device for effecting a local reduction in release pipe pressure, a plurality of application reservoirs charged with fluid under pressure, a plurality of release reservoirs charged with fluid under pressure, and a brake valve device operative in a service application zone to establish communication through which fluid under pressure is supplied from one or more of the application reservoirs to effect the operation of the application pilot vent valve device to effect a reduction in brake pipe pressure and operative in a release zone to supply fluid under pressure to the brake pipe and to establish communication through which fluid under pressure is supplied from one or more of the release reservoirs to the release pilot vent valve device to effect the operation of the release pilot vent valve device to effect a reduction in release pipe pressure and operative in the last position in the service application zone to effect a reduction in brake pipe pressure independently of the operation of the application pilot vent valve device.

51. In a fluid pressure brake for a train, a brake pipe, a release pipe, a brake controlling valve mechanism on each car of the train comprising a combined application and release valve means and a release valve device, said means and valve device operating upon a reduction in brake pipe pressure for effecting an application of the brakes and operating upon an increase in brake pipe pressure and a reduction in release pipe pressure for effecting a release of the brakes, an application pilot vent valve device operative to initiate a reduction in brake pipe pressure, a transmitter valve device on each car of the train responsive to the reduction in brake pipe pressure effected by said application pilot vent valve device for effecting a local reduction in brake pipe pressure, a release pilot vent valve device operative by fluid under pressure for initiating a reduction in release pipe pressure, a transmitter valve device on each car of the train responsive to the reduction in release pipe pressure effected by the release pilot vent valve device for effecting a local reduction in release pipe pressure, a plurality of application reservoirs charged with fluid under pressure, a plurality of release reservoirs charged with fluid under pressure, and a brake valve device operative in a service application zone to establish communication through which fluid under pressure is supplied from one or more of the application reservoirs to effect the operation of the application pilot vent valve device to effect a reduction in brake pipe pressure and operative in a release zone to supply fluid under pressure to the brake pipe and to establish communication through which fluid under pressure is supplied from one or more of the release reservoirs to the release pilot vent valve device to effect the operation of the release pilot vent valve device to effect a reduction in release pipe pressure, and operative in the last position in the service application zone to effect a reduction in brake pipe pressure independently of the operation of the application pilot vent valve device, and operative in the last position in the release zone to connect the release pipe to the atmosphere independently of the operation of the release pilot vent valve device.

52. In a fluid pressure brake equipment, in combination, a brake pipe, a release pipe, a reduction in pressure in which latter pipe effects a release of the brakes, a brake controlling valve mechanism operated upon a reduction in brake pipe pressure for effecting an application of the brakes, and operable upon an increase in brake pipe pressure to a charging position in which the equipment is charged without effecting the release of the brakes and operable upon an increase in brake pipe pressure and a reduction in release pipe pressure for effecting the release of the brakes, and a brake valve device having a plurality of application positions for effecting reductions in brake pipe pressure, one position for effecting an increase in brake pipe pressure and a plurality of positions for effecting an increase in brake pipe pressure and reductions in release pipe pressure.

53. In a fluid pressure brake equipment, in combination, a normally charged brake pipe, a normally vented release pipe, a brake controlling valve mechanism operative upon a reduction in brake pipe pressure for supplying fluid under pressure to effect an application of the brakes, a valve device subject to the pressure of fluid supplied by the brake controlling valve device for charging the release pipe with fluid under pressure, said brake controlling valve mechanism being responsive to an increase in brake pipe pressure and a reduction in release pipe pressure for effecting a release of the brakes and being responsive to an increase in brake pipe pressure to recharge the equipment without effecting a release of the brakes, and a brake valve device having an application zone of movement in which a reduction in brake pipe pressure is effected and fluid under pressure is supplied to actuate said valve device, and having a charging position in which the brake pipe is supplied with fluid under pressure and also having a release zone in which fluid under pressure is supplied to the brake pipe and released from the release pipe.

54. In a fluid pressure brake equipment, in combination, a normally charged brake pipe, a normally vented release pipe, a brake controlling valve mechanism operative upon a reduction in brake pipe pressure for supplying fluid under pressure to effect an application of the brakes, a valve device subject to the pressure of fluid supplied by the brake controlling valve device for charging the release pipe with fluid under pressure, said brake controlling valve mechanism being responsive to an increase in brake pipe pressure and a reduction in release pipe pressure for effecting a release of the brakes and being responsive to an increase in brake pipe pressure to recharge the equipment without effecting a release of the brakes, and a brake valve device having an application zone of movement in which the brake pipe pressure is adapted to be reduced in increments and in which fluid under pressure is supplied to actuate said valve device to supply fluid under pressure to the release pipe in increments corresponding to the increments of reduction in brake pipe pressure, and having a position in which fluid under pressure is supplied to the brake pipe without varying the release pipe pressure, and having a release zone of movement in which the brake pipe pressure is adapted to be increased and the release pipe pressure adapted to be reduced in increments.

55. In a vehicle fluid pressure brake equipment, in combination, a brake pipe, a normally vented release pipe, a brake controlling valve mechanism operated upon a reduction in brake pipe pressure to effect an application of the brakes and operated upon an increase in brake pipe pressure for charging the equipment without effecting a release of the brakes and operated upon an increase in brake pipe pressure and a reduction in release pipe pressure for effecting a release of the brakes, a valve device operative upon the operation of said valve mechanism to its brake applying position to charge the release pipe with fluid under pressure, and a brake valve device operative to one position to effect a reduction in brake pipe pressure to another position to effect an increase in brake pipe pressure and to another position for increasing brake pipe pressure and a reduction in release pipe pressure, said brake valve device in the last mentioned position being adapted to effect only a reduction in release pipe pressure if the brake pipe has been charged previous to the brake valve device being moved to the last mentioned position.

56. In a vehicle fluid pressure brake equipment, in combination, a brake pipe, a normally vented release pipe, a brake controlling valve mechanism operated upon a reduction in brake pipe pressure to effect an application of the brakes and operated upon an increase in brake pipe pressure for charging the equipment without effecting a release of the brakes and operated upon an increase in brake pipe pressure and a reduction in release pipe pressure for effecting a release of the brakes, a valve device operative upon the operation of said valve mechanism to its brake applying position to charge the release pipe with fluid under pressure, a brake valve device operative to one position to effect a reduction in brake pipe pressure to another position to effect an increase in brake pipe pressure and to another position for increasing brake pipe pressure and a reduction in release pipe pressure, said brake valve device in the last mentioned position being adapted to effect only a reduction in release pipe pressure if the brake pipe has been charged previous to the brake valve device being moved to the last mentioned position, and means operative automatically according to the rate of deceleration of the vehicle to supply fluid under pressure to the brake pipe and to release fluid under pressure from the release pipe to effect the release of the brakes, said means being adapted to release fluid from the release pipe and being ineffective to vary the brake pipe pressure if the brake pipe has been previously charged with fluid under pressure.

57. In a fluid pressure brake, in combination, a brake pipe, a brake cylinder, a brake controlling valve mechanism operated upon a reduction in brake pipe pressure for supplying fluid under pressure to the brake cylinder, a brake valve device having a service application position for causing a reduction in brake pipe pressure to be effected and having an emergency position for causing a reduction in brake pipe pressure to be effected, a normally open valve past which fluid under pressure vented from the brake pipe is adapted to flow, means operable according to brake cylinder pressure for closing said valve, and a communication established by said brake valve device in emergency position through which fluid under pressure vented from the brake pipe by-passes said valve thereby rendering the valve ineffective to limit the flow of fluid from the brake pipe.

58. In a fluid pressure brake, in combination, a brake pipe, a brake cylinder, a brake controlling valve mechanism operated upon a reduction in brake pipe pressure for supplying fluid under pressure to the brake cylinder, a brake valve device having a service application position for causing a reduction in brake pipe pressure to be effected and having an emergency position for causing a reduction in brake pipe pressure to be effected, a cut-off valve device operative in effecting a full service application of the brakes to limit the reduction in brake pipe pressure to a chosen amount, and means in the emergency position of the brake valve device establishing a communication through which fluid under pressure is adapted to be vented from the brake pipe independently of the cut-off valve device.

59. In a fluid pressure brake, in combination, a brake pipe, a brake cylinder, a brake controlling valve mechanism operated upon a reduction in brake pipe pressure for supplying fluid under pressure to the brake cylinder, a brake valve device having a service application position for causing a reduction in brake pipe pressure to be effected and having an emergency position for causing a reduction in brake pipe pressure to be effected, a cut-off valve device operative in effecting a full service application of the brakes to limit the reduction in brake pipe pressure to a chosen amount, and means included in the brake valve device adapted in the emergency position of the brake valve device to establish a venting communication from the brake pipe, which venting communication by-passes the cut-off valve device.

CARLTON D. STEWART.
CLYDE C. FARMER.